(12) United States Patent
Herkommer et al.

(10) Patent No.: US 9,151,338 B2
(45) Date of Patent: Oct. 6, 2015

(54) FRICTION CLUTCH WITH READJUSTMENT DEVICE

(71) Applicant: Schaeffler Technologies GmbH & Co. KG, Herzogenaurach (DE)

(72) Inventors: Dominik Herkommer, Schriesheim (DE); René Daikeler, Buehlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/474,978

(22) Filed: Sep. 2, 2014

(65) Prior Publication Data

US 2014/0367218 A1 Dec. 18, 2014

Related U.S. Application Data

(63) Continuation of application No. PCT/EP2013/054087, filed on Feb. 28, 2013.

(30) Foreign Application Priority Data

Mar. 16, 2012 (DE) .......................... 10 2012 204 201

(51) Int. Cl.
*F16D 13/75* (2006.01)
*F16D 13/58* (2006.01)
*F16D 13/52* (2006.01)

(52) U.S. Cl.
CPC .............. *F16D 13/757* (2013.01); *F16D 13/52* (2013.01); *F16D 13/585* (2013.01)

(58) Field of Classification Search
CPC ................................ F16D 13/75; F16D 13/757
USPC .............. 192/107 C, 111.16, 111.17, 70.252, 192/70.29
See application file for complete search history.

(56) References Cited

U.S. PATENT DOCUMENTS 5,409,091 A * 4/1995 Reik et al. ................ 192/70.252
5,937,986 A * 8/1999 Schubert .................. 192/70.252

FOREIGN PATENT DOCUMENTS

| DE | 102008010997 A1 | 9/2008 |
| DE | 102009005743 A1 | 8/2009 |
| DE | 102010034813 A1 | 3/2011 |
| DE | 102011084840.1 A1 | 4/2013 |
| EP | 1568905 A1 | 8/2005 |

OTHER PUBLICATIONS

Meinhard et al. (DE102009005738 A1)—Aug. 20, 2009 (machine translation).*

* cited by examiner

*Primary Examiner* — Robert Hodge
*Assistant Examiner* — Tinh Dang
(74) *Attorney, Agent, or Firm* — Simpson & Simpson, PLLC

(57) ABSTRACT

A friction clutch having a counter-pressure plate and a pressing plate that is rotationally fixed and axially movable in relation to the latter, a cover part which is firmly connected to the counter-pressure plate, a lever spring clamped between the pressing plate and cover part having an encircling power rim and levers extending radially inward and distributed around the circumference and support zones extending radially outward, a clutch plate having friction linings which may be brought into frictional engagement between the counter-pressure plate and the pressing plate dependent on an axial engaging force applied to the levers contrary to the effect of a lining resiliency, a compensation spring effectively countering the lining resiliency between the counter-pressure plate and the pressing plate, and an adjusting device having a drive spring in the form of an opened ring situated on the lever spring.

9 Claims, 4 Drawing Sheets

FRICTION CLUTCH WITH READJUSTMENT DEVICE

CROSS-REFERENCE TO RELATED APPLICATIONS

This patent application is filed under 35 U.S.C. §111(a), 35 U.S.C. §120 and 35 U.S.C. §365(c) as a continuation of PCT Patent Application No. PCT/EP2013/054087 filed Feb. 28, 2013, which application claims priority from German Patent Application No. 102012204201.6 filed Mar. 16, 2012, which applications are incorporated herein by reference in their entireties.

FIELD OF THE INVENTION

The invention relates to a friction clutch having a counter-pressure plate, and a pressing plate that is rotationally fixed and axially movable in relation to the latter, a cover part which is firmly connected to the counter-pressure plate, a lever spring clamped between the pressing plate and cover part having an encircling power rim and levers extending radially inward and distributed around the circumference and support zones extending radially outward, a clutch plate having friction linings which may be brought into frictional engagement between the counter-pressure plate and pressing plate dependent on an axial engaging force applied to the levers contrary to the effect of a lining resiliency, a compensation spring effectively counteracting the lining resiliency between the counter-pressure plate and the pressing plate, and an adjusting device having a drive spring in the form of an opened ring situated on the lever spring, attached to the levers by means of sensing tongues extending radially inward, having a pawl situated on a ring end, which meshes with a pinion situated rotatably on the lever spring, which has a worm gear on the opposite side.

BACKGROUND OF THE INVENTION

Friction clutches of this sort, which are combined, for example, into a double clutch, are known, for example, from DE 10 2009 005 743 A1. A shared counter-pressure plate is provided here, to which a non-rotating and axially movable pressing plate of a friction clutch in each case is assigned from each side. Both friction clutches are pressure-engaged by means of a lever spring each, which are situated on one side of the double clutch on both sides of a cover part, which is firmly connected to the counter-pressure plate and to this end are braced between the latter and the pressing plate. At the same time, one friction clutch is impinged upon directly by the lever spring assigned to it, and the other is acted upon by means of a tie rod which is connected to the pressing plate, which overlaps the counter-pressure plate and the cover part and enters into operative engagement with the lever spring which is assigned to the latter, so that when the radially inner lever tips are acted upon axially by means of an actuating system each in the direction of the counter-pressure plate, the one friction clutch is pressure-engaged directly by the lever spring and the other friction clutch is tension-engaged by means of the tie rod.

At the same time, both friction clutches have a self-adjusting adjusting device to compensate for the wear of the friction lining situated between the counter-pressure plate and the pressing plate, which is designed in the nature of a diaphragm spring lever assembly of DE 10 2008 010 997 A1. At the same time, a drive spring in the form of an open ring is situated on radially oriented levers of the lever spring distributed around the circumference of a ring-shaped power rim. The drive spring is connected to the lever spring through sensing tongues attached to the levers. The drive spring changes its circumference depending on the changing shape of the lever spring across an engagement path, there being a pawl situated at one end, which meshes with a pinion that is rotatably fastened to the lever spring. On the other side of the lever spring a worm gear is provided on the pinion, which drives a component provided with ramps that rise in the circumferential direction, which is operatively provided between lever spring and pressing plate, or between lever spring and tie rod. If the engagement path is elevated due to wear of the friction linings, a more pronounced deformation of the lever spring occurs when the friction clutch is in the engaged state, so that the circumference of the drive spring is reduced and the pawl jumps over one or more teeth of the pinion, and as the friction clutch disengages, the simultaneous pre-tensioning of the drive spring twists the freed component, so that the ramps, which are turned by a specified amount, compensate for the wear.

The friction linings, which form the frictional engagement with the opposing frictional surfaces of the counter-pressure plate and the pressing plate, are provided with a lining resiliency against each other, which along with the leaf springs, which receive the pressing plate non-rotatingly and axially movably on the counter-pressure plate or on the cover part when the friction clutch engages, counteract the engaging force of the actuating system. In order to compensate at least partially for the lining resiliency in the area of the friction clutch which transmits maximum torque, in the German patent application 10 2011 084 840.1, not previously published, a compensation spring is proposed, situated between the pressing plate of the counter-pressure plate or cover part and the pressing plate, which may be designed, for example, as an overtensioned diaphragm spring. The characteristic curve of the lining resiliency can change due to aging, setting processes and the like, so that the compensation spring fulfills the desired compensation function of partial or total compensation only insufficiently beyond the service life. As a result, an engagement force behavior of the friction clutch is subject to fluctuations over the service life.

BRIEF SUMMARY OF THE INVENTION

The object of the invention is therefore to propose a friction clutch whose engagement force behavior is improved over the service life.

The object is fulfilled by a friction clutch having a counter-pressure plate and a pressing plate that is rotationally fixed and axially movable in relation to the latter, a cover part which is firmly connected to the counter-pressure plate, a lever spring clamped between the pressing plate and cover part having an encircling power rim and levers extending radially inward and distributed around the circumference and support zones extending radially outward, a clutch plate having friction linings which may be brought into frictional engagement between the counter-pressure plate and pressing plate dependent on an axial engaging force applied to the levers contrary to the effect of a lining resiliency, a compensation spring effectively counteracting the lining resiliency between the counter-pressure plate and the pressing plate, and an adjusting device having a drive spring in the form of an opened ring situated on the lever spring, attached to the levers by means of sensing tongues extending radially inward, having a pawl situated on a ring end, which meshes with a pinion situated rotatably on the lever spring, which has a worm gear on the opposite side, wherein the worm gear is drive-connected to the compensation spring or the cover part and turns the pinion depending on a pawl which moves depending on engagement force, and a relative rotation occurs between the lever spring and the compensation spring or the cover part by means of the rotating worm, while a radius of a contact zone of the compensation spring changes depending on the relative rotation.

Due to a change in the radius of the contact zone, the clamping geometry of the compensation spring is corrected over the service life so that the characteristic curve of the compensation spring can be made to track the characteristic curve of the lining resiliency, which changes over the service life. At the same time, the engaging force of the friction clutch is stabilized over the service life at least to the extent that it depends on the change in the characteristic curve of the lining resiliency. An engagement path which must be compensated for due to the decrease in thickness of the friction lining is preferably compensated for in a different way, for example in an actuation system such as a clutch actuator, or an engaging mechanism situated between the lever spring and the latter. An adjustment of the compensation spring is introduced in this case, when as a result of engaging forces which are increased due to a change in the lining resiliency the lever spring is elastically pre-tensioned during an engagement process beyond a prescribed measure, so that the circumference of the drive spring applied to the lever spring changes by a predefined measure compared to the circumference of the power rim of the lever spring, so that the pawl jumps over one or more teeth of the pinion. In this way, the adjustment and activation of the adjusting device are power-controlled.

According to an advantageous embodiment, the overlay area is formed of two profile regions braced against each other, one of which is operatively assigned to the compensation spring and the other to the pressing plate, where a first profile region has radially oriented profile surfaces distributed around the circumference and a second profile region has spiral-shaped profile surfaces distributed complementarily around the circumference. Due to the relative rotation between the profile regions, caused by the drive spring through the pinion and ring gear, the overlay points distributed around the circumference shift radially between the radially oriented and the spiral-shaped profile surfaces, so that the radius of the overlay points changes, and thus as a consequence of the changing lever geometry, the characteristic curve changes. At the same time, due to the change of the radius through the relative rotation, the direction and pitch of the spiral-shaped profile surfaces are specified, and are adapted to the change in the characteristic curve of the lining resiliency. It goes without saying that in other embodiments both profile regions may have a radial portion and a portion provided in the circumferential direction; for example, they may be designed in spiral form in opposite directions.

In the case of a pressing plate which is moved directly by the lever spring, the compensation spring is clamped between the pressing plate and the counter-pressure plate or between the pressing plate and the cover part. In this case, on the one hand, the first profile region may be provided on the compensation spring, and on the other hand, the second profile region may be provided on the pressing plate or on the cover part. In the case of components made from sheet metal, such as the compensation spring and/or the cover part, the profile surface of the first profile region may be stamped into the sheet metal part as a single piece. With solid components, for example forged or cast components, such as the pressing plate or the counter-pressure plate, for example, the profile surfaces of the corresponding profile region may be provided already in the production process and reworked mechanically if necessary, or attached solidly as overlay parts, for example welded, riveted or fastened in a similar manner.

In the case of a friction clutch that is tension-engaged by means of a tie rod positioned between the lever spring and the pressing plate and a compensation spring clamped between the cover part and the tie rod, the profile regions may be provided between the tie rod and the compensation spring, or alternatively between the cover part and the compensation spring. In this case, both profile surfaces of the profile regions may be stamped as a single piece from the components formed from sheet metal—compensation spring, tie rod, cover part.

The relative rotation between the profile regions which brings about the change in the radius occurs because one component which has a profile region is held non-rotatingly, and the other component is situated so that it is able to twist. For example, the lever spring may be received non-rotatingly in relation to the cover part, and the compensation spring clamped between the cover part or the counter-pressure plate and the pressing plate, enabling it to twist. Particularly in the case of arrangements that have a tie rod, the lever spring may be received on the cover part so that it is able to twist, and the compensation spring situated non-rotatingly. In this case, the compensation spring is preferably situated between tie rod and cover part, while the lever spring which is clamped radially outside against the tie rod twists relative to the latter when an adjustment occurs. In this case, the lever spring is driven by the drive spring, because the worm gear bears against the teeth of the non-rotatingly clamped compensation spring.

Furthermore, the compensation spring may be received as a single piece in the lever spring advantageously, and in particular for reasons of cost and production, to reduce the number of components of the friction clutch. Here, the lever spring is situated rotatably in relation to the cover part, and is driven by the pawl, the pinion and the worm gear. The radius of the overlay area of the lever spring, or of the compensation spring integrated into the latter, changes over the relative rotation, achieving the same effect as in the case of a separate design of the compensation spring and the lever spring. For the single-piece design with the compensation spring, the lever spring has areas of varying stiffness.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
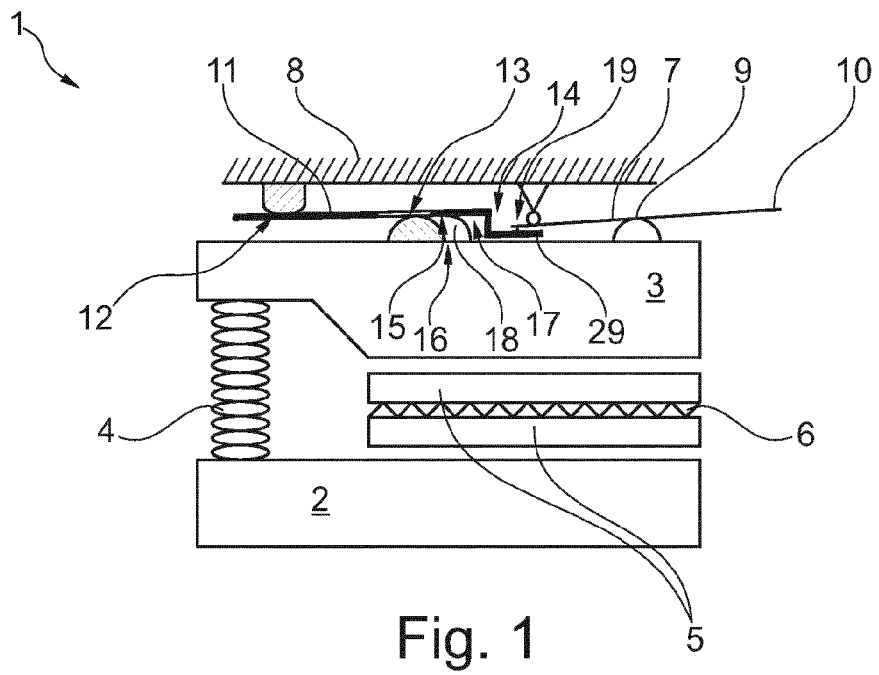
FIG. 1 is a schematic partial sectional view of a friction clutch with an adjusting device.

FIG. 1 shows friction clutch 1 in partial section and schematic view. Additional information about the general configuration of such friction clutches may be obtained from the named prior art. Friction clutch 1 contains counter-pressure plate 2 and the ring-shaped pressing plate 3, which is situated non-rotatingly in relation to the latter and is axially movable by means of the leaf springs 4—depicted here as a leaf spring assembly. Friction clutch 1 is disengaged in the non-actuated state, in that the pressing plate 3 of the leaf springs 4 is spaced far enough away from the counter-pressure plate 2 so that no frictional engagement is formed with the friction linings 5, which are situated, for example, on a clutch plate. The friction linings 5, which are connected to each other forming the lining resiliency 6, form a frictional engagement with pressing plate 3 and counter-pressure plate 2, while the clamping pressing plate 3 acts contrary to the effect of the leaf springs 4, whereby the clamping force is provided by the lever spring 7, which is braced axially against the cover part 8, which is firmly connected to the counter-pressure plate 2, and bears on the overlay area 9 of the pressing plate 3. To this end, the lever spring 7 is acted on its radially inner lever spring zones 10 by an actuating system, such as an engagement system.

In particular at maximum transmissible torque, the pressing plate must be significantly pre-tensioned, while compressing the lining resiliency. To lessen the engaging force necessary at the lever spring regions 10, the compensation spring 11 is provided, which in the exemplary embodiment shown is clamped between the overlay area 12 of the cover part 8 and the overlay area 13 of the pressing plate 3, and is preferably designed as an over-tensioned diaphragm spring. The compensation spring 11 counteracts the lining resiliency 6, and thereby reduces the engaging force. To adapt the characteristic curve of the compensation spring 11 to the characteristic curve of the lining resiliency 6, which changes over the service or operating life of friction clutch 1, the adjusting device 14 is provided, which comprises the two profile regions 15, 16 with the profile surfaces 17, 18, as well as the sensing device 19 situated on the lever spring 7. On the basis of an increased engagement force when the friction clutch 1 is fully engaged, the sensing device 19 detects through a changed characteristic curve of the lining resiliency a need for adjustment, and by means of the worm gear 29 meshing with the compensation spring 11 turns a rotation of the rotatably situated compensation spring 11, so that the profile surfaces 17, 18 set an overlay area 13 when the radius is changed and on the basis of the changed clamping circumstances of the compensation spring 11 set its characteristic curve to the changed characteristic curve of the lining resiliency 6 for tracking. This keeps the engaging force constant, except for the fluctuations in force between two switching operations of the sensing device 19.

Figure 2:
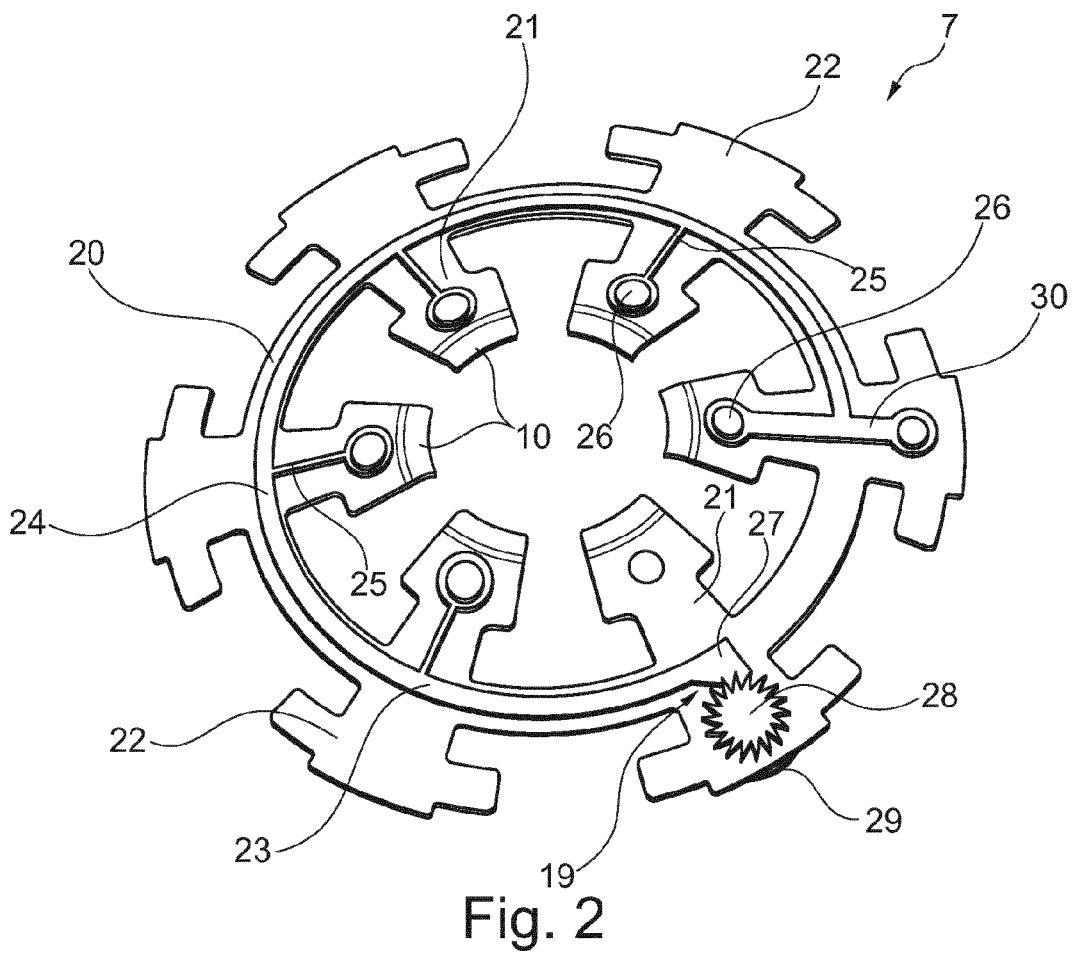
FIG. 2 is a view of a lever spring with drive spring, of the friction clutch of FIG. 1.

FIG. 2 shows the lever spring 7 of FIG. 1 in constructional design with the ring-shaped power rim 20, preferably situated at the level of the overlay area 9 of FIG. 1, on which the levers 21 with the lever spring regions 10 are situated as a single piece, distributed around the circumference and oriented radially toward the inside. The supporting areas 22 of the lever springs 7 are provided, preferably on the diameters of the levers 21, extended radially toward the outside, to support the lever springs 7 on the cover part 8 (FIG. 1). The sensing device 19 contains the drive spring 23 whose power rim 24 rests against the power rim 20 of the lever spring, and whose sensing tongues 25, extended radially inward, are each connected to a lever 21 radially toward the inside by means of a rivet 26. The ring-shaped, open drive spring 23 is connected firmly at one ring end 30 to the lever spring 7, and at its other ring end has the pawl 27 which meshes with the pinion 28, which is received rotatably on the lever spring 7. Situated on the inner side of the pinion 28 is the worm gear 29, which drives the compensation spring 11 of FIG. 1 in the event of adjustment.

Figure 3:
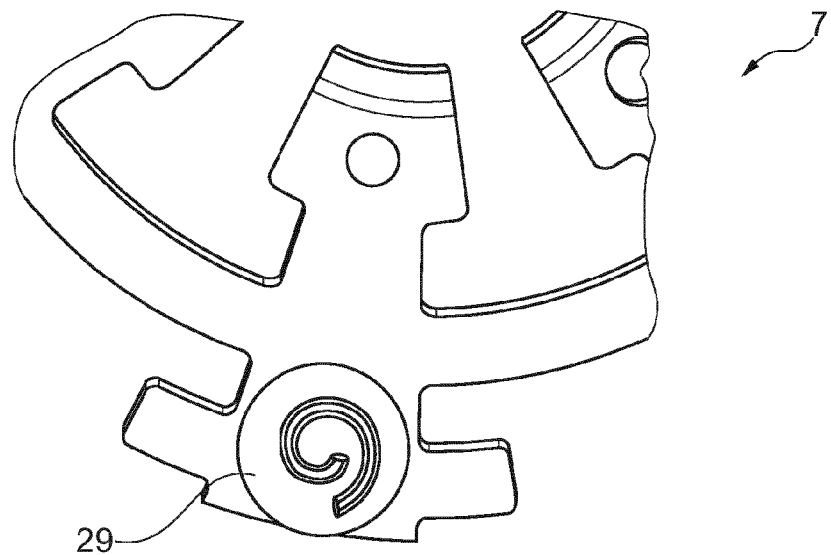
FIG. 3 is a detail view of the back of the lever spring of FIG. 2.

FIG. 3 shows a rear view of the lever spring 7 with the worm gear 29, which meshes, for example, with end teeth or a gear rack section of the compensation spring 11 of FIG. 1 and rotary drives it as it turns.

Figure 4:
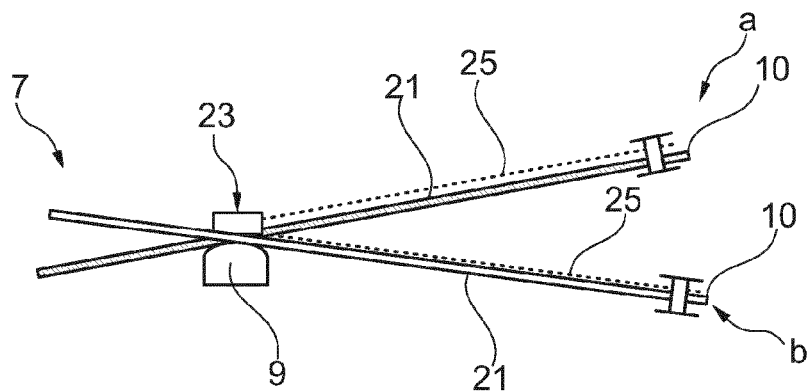
FIG. 4 is a schematic sectional view of the lever spring of FIG. 2 in normal operation.
Figure 5:
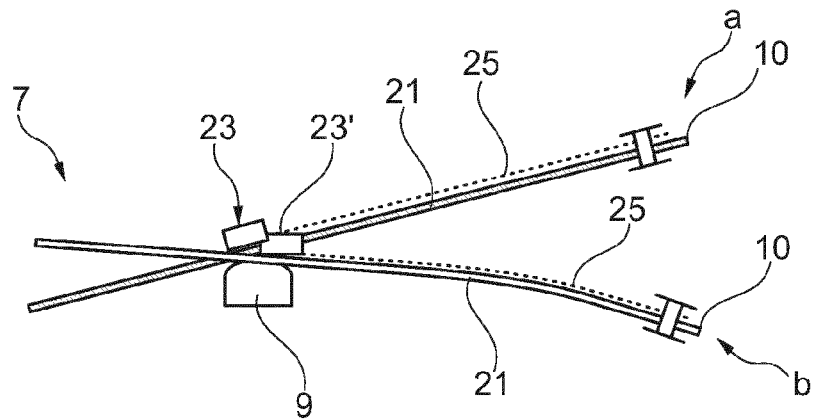
FIG. 5 is a schematic sectional view of the lever spring of FIG. 2 in adjusting operation.

To explain the adjusting function of the sensing device 19 of FIG. 2, FIGS. 4 and 5 show the lever spring 7 with the levers 21 and the sensing tongues 25 of the drive spring 23 supported on it, each in the disengaged position a and in the engaged position b of the friction clutch 1 of FIG. 1. The lever spring 7 is subjected to an axial force at its lever spring area 10, and with an engaging force moves the overlay area 9 of the pressing plate 3 of FIG. 1. The normal state of the friction clutch 1 is shown here in FIG. 4. In the disengaged position a, the levers are set upright, and in the engaged position b of the friction clutch they are moved inward. In the normal state, with the maximum torque to be transmitted, the levers 21 are bent only negligibly, since the compensation spring 11 of FIG. 1 compensates sufficiently for the lining resiliency. FIG. 5 depicts the adjusting state, in which the compensation spring no longer compensates sufficiently for the lining resiliency. Starting from the disengaged position a, to transmit the maximum torque, in the engaged position b the levers 21 are bent as a result of a greater requisite engaging force, and the sensing tongues 25, which are riveted radially on the inside, are moved, so that the drive spring 23 at its original position on the power rim of the lever spring 7 is moved radially inward, which is represented by the drive spring 23'. This causes the pawl 27 to move in the pinion 28 of FIG. 2. This causes a tension to be exerted on the pinion 28 by the drive spring 23 when the friction clutch 1 disengages. As a result of the releasing of pre-stressing on the compensation spring 11 as the friction clutch 1 disengages, the latter is now turned by the pinion 28 through the worm gear.

Figures 6, 7:
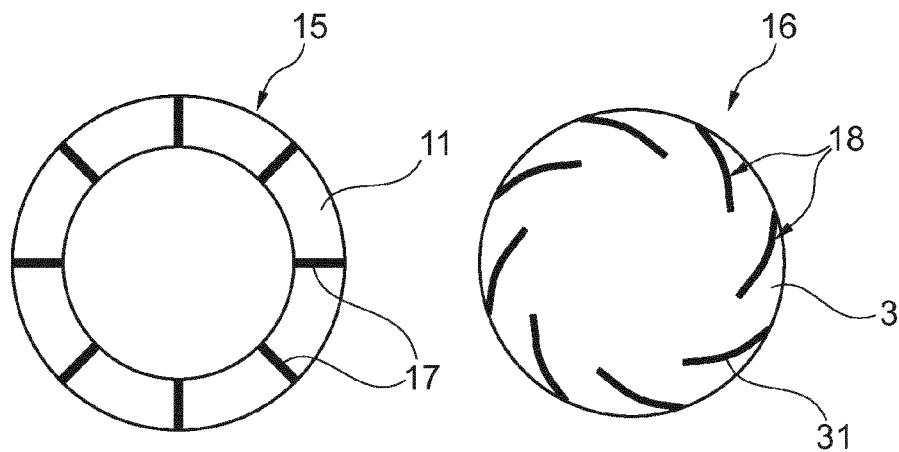
FIG. 6 is a schematic view of a profile region.
FIG. 7 is a schematic view of a profile region complementary to the profile region of FIG. 6.

FIG. 6 shows a schematically depicted view of the profile region 15 of the compensation spring 11 of FIG. 1. The profile region 15 is formed from radially oriented profile surfaces 17 distributed around the circumference, for example shaped or opened out from the compensation spring 11.

FIG. 7 shows a schematically depicted view of the profile region 16 of the pressing plate 3 of FIG. 1. The profile region 16 is formed from profile surfaces 18 distributed around the circumference, for example from overlay parts 31 solidly accommodated on the pressing plate 3. The form of the profile surfaces 18 is spiral-shaped. It goes without saying that the profile regions 16, 17 depicted in FIGS. 6 and 7 may also be arranged inversely on the pressing plate 3, or on the compensation spring.

Figure 8:
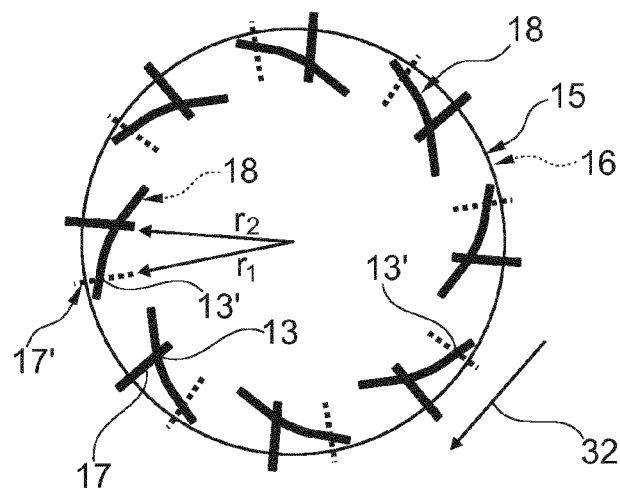
FIG. 8 is a working sketch of the two profile regions of FIGS. 6 and 7, overlaid on each other; and, FIG. 9 is a schematically depicted section through a friction clutch having a one-piece lever and a compensation spring.

FIG. 8 shows a schematic representation of the two profile regions 15, 16 of FIGS. 6, 7, overlaid on each other, with the profile surfaces 17, 17', 18. In the non-adjusted state between the profile surfaces 17' and the profile surfaces 18, the overlay areas 13' with the radius $r_1$ are formed. In the event of adjustment, the two profile regions 15, 16 turn contrary to each other in the direction of the arrow 32, so that the profile surfaces 17, 18 form the new overlay areas 13 with the radius $r_2$. Due to the changed clamping situation of the compensation spring 11, the characteristic curve of the latter is adjusted to the characteristic curve of the lining resiliency 6 (FIG. 1) until a new readjustment is necessary.

Figure 9:
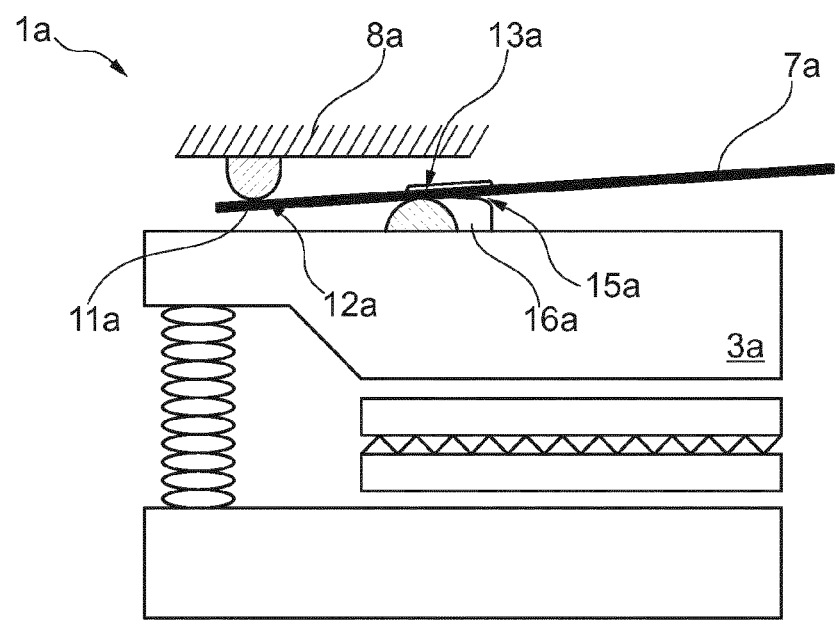

As a modification of the friction clutch 1 of FIG. 1, friction clutch 1a of FIG. 9 shows the compensation spring 11a, which is accommodated in a single piece in the lever spring 7a, preferably in the area of the latter's power rim. The region of the lever spring 7a with the compensation spring 11a is supported here on the overlay area 12a, which is situated firmly on the cover part 8a, and on the overlay area 13a of the pressing plate 3a. The profile regions 15a, 16a provided on the overlay area 13a correspond here, to the greatest possible extent, with regard to their function, to the profile regions 15, 16 of FIGS. 1, 6, 7 and 8. The readjustment with the change of the radius of the overlay area 13a takes place by means of a relative rotation of the lever spring 7a with respect to the pressing plate 3a or the cover part 8a. In a corresponding design of the drive of the compensation spring 11 of FIG. 1 by means of the pinion 18 of FIG. 2, in the friction clutch 1 of the figure the driving of the lever spring 7a takes place by means of the pinion, the worm gear being supported on a component which is connected to the cover part 8a or to the pressing plate 3a or to some other component which is connected to these parts, or directly to these parts themselves.

LIST OF REFERENCE NUMBERS 1 friction clutch
1a friction clutch
2 counter-pressure plate
3 pressing plate
3a pressing plate
4 leaf spring
5 friction lining
6 lining resiliency
7 lever spring
7a lever spring
8 cover part
8a cover part
9 overlay area
10 lever spring area
11 compensation spring
11a compensation spring
12 overlay area
12a overlay area
13 overlay area
13a overlay area
13' overlay area
14 adjusting device
15 profile region
15a profile region
16 profile region
16a profile region
17 profile surface
17' profile surface
18 profile surface
19 sensor device
20 power rim
21 lever
22 supporting area
23 drive spring
23' drive spring
24 power rim
25 sensing tongue
26 rivet
27 pawl
28 pinion
29 worm gear
30 ring end
31 overlay part
32 arrow
a disengaged position
b engaged position
$r_1$ radius
$r_2$ radius

What is claimed is:

1. A friction clutch having a counter-pressure plate and a pressing plate that is rotationally fixed and axially movable in relation to the latter, a cover part which is firmly connected to the counter-pressure plate, a lever spring clamped between the pressing plate and the cover part having an encircling power rim and levers extending radially inward and distributed around the circumference and support zones extending radially outward, a clutch plate having friction linings which may be brought into frictional engagement between the counter-pressure plate and the pressing plate dependent on an axial engaging force applied to the levers contrary to the effect of a lining resiliency, a compensation spring effectively counteracting the lining resiliency between the counter-pressure plate and the pressing plate, and an adjusting device having a drive spring in the form of an opened ring situated on the lever spring, attached to the levers by means of sensing tongues extending radially inward, having a pawl situated on a ring end, which meshes with a pinion situated rotatably on the lever spring, which has a worm gear on the opposite side, wherein the worm gear is drive-connected to the compensation spring or the cover part, turns the pinion depending on the pawl which moves depending on engagement force, and a relative rotation occurs between the lever spring and the compensation spring or the cover part by means of the rotating worm gear, while a radius of an overlay area of the compensation spring changes depending on the relative rotation,
wherein the overlay area is formed of two profile regions braced against each other, one of which is operatively assigned to the compensation spring and the other to the pressing plate, where a first profile region has radially oriented profile surfaces distributed around the circumference and a second profile region has spiral-shaped profile surfaces distributed complementarily around the circumference.

2. The friction clutch recited in claim 1, wherein the first profile region is provided on the compensation spring and the second profile region is provided on the pressing plate.

3. The friction clutch recited in claim 2, wherein the profile surface of the first profile region is stamped as a single piece from the compensation spring.

4. The friction clutch recited in claim 2, wherein the profile surface of the second profile region is made from overlay parts which are connected to the pressing plate.

5. The friction clutch recited in claim 1, wherein in the case of a friction clutch which is tension-engaged by means of a tie rod situated between the lever spring and the pressing plate, and a compensation spring clamped between the cover part and the tie rod, the profile regions are provided between the tie rod and the compensation spring.

6. The friction clutch recited in claim 5, wherein both profile surfaces of the profile regions are stamped as single pieces from the compensation spring or the tie rod.

7. The friction clutch recited in claim 1, wherein the lever spring is received non-rotatingly relative to the cover part, and the compensation spring is clamped in rotatably.

8. The friction clutch recited in claim 1, wherein the lever spring is accommodated rotatably on the cover part and the compensation spring is situated non-rotatingly.

9. The friction clutch recited in claim 1, wherein the compensation spring is integrated into the lever spring such that the compensation spring and lever spring form a single piece, the lever spring is configured to be rotationally driven by the worm gear, and a radius of the overlay area is configured to be changed when rotation occurs.

* * * * *